United States Patent
Tsuzuki

(10) Patent No.: US 9,131,172 B2
(45) Date of Patent: Sep. 8, 2015

(54) IMAGE PROCESSING APPARATUS AND METHOD FOR DETECTING MOTION USING LONG EXPOSURES IMAGES AND THEN PERFORMING INFINITE IMPULSE RESPONSE FILTERING ON SHORT EXPOSURE IMAGE

(71) Applicant: Samsung Techwin Co., Ltd., Changwon (KR)

(72) Inventor: Takeru Tsuzuki, Changwon (KR)

(73) Assignee: Hanwha Techwin Co., Ltd., Changwon (KR)

( * ) Notice: Subject to any disclaimer, the term of this patent is extended or adjusted under 35 U.S.C. 154(b) by 149 days.

(21) Appl. No.: 14/073,340

(22) Filed: Nov. 6, 2013

(65) Prior Publication Data

US 2014/0152861 A1    Jun. 5, 2014

(30) Foreign Application Priority Data

Nov. 30, 2012   (JP) ............................... 2012-0263136
Aug. 20, 2013   (KR) ....................... 10-2013-0098604

(51) Int. Cl.
*H04N 9/73*   (2006.01)
*H04N 5/335*  (2011.01)
*H04N 5/232*  (2006.01)

(52) U.S. Cl.
CPC ......... *H04N 5/3355* (2013.01); *H04N 5/23254* (2013.01)

(58) Field of Classification Search
CPC .................................................. H04N 5/23254
See application file for complete search history.

(56) References Cited

U.S. PATENT DOCUMENTS

| | | | |
|---|---|---|---|
| 7,409,104 B2 * | 8/2008 | Vitsnudel et al. | 382/284 |
| 7,548,689 B2 | 6/2009 | Yap et al. | |
| 7,746,934 B2 * | 6/2010 | Chen et al. | 375/240.29 |
| 8,548,234 B2 | 10/2013 | Moon et al. | |
| 2009/0040337 A1 * | 2/2009 | Vitsnudel et al. | 348/229.1 |
| 2012/0041695 A1 * | 2/2012 | Baldwin | 702/56 |
| 2014/0044366 A1 * | 2/2014 | Yamaguchi et al. | 382/232 |

FOREIGN PATENT DOCUMENTS

JP    2012-119761 A    6/2012
KR    10-2009-0020917 A    2/2009

* cited by examiner

*Primary Examiner* — Gary C Vieaux
(74) *Attorney, Agent, or Firm* — Sughrue Mion, PLLC

(57) ABSTRACT

Provided is an image processing apparatus and method. The image processing apparatus includes: a detection unit configured to detect a motion by using a long-exposed image in a current frame and a long-exposed image in a previous frame; and a processing unit configured to perform infinite impulse response (IIR) filtering on a short-exposed image in the current frame according to a result of the detecting of the motion which is obtained from the detection unit.

20 Claims, 3 Drawing Sheets

IMAGE PROCESSING APPARATUS AND METHOD FOR DETECTING MOTION USING LONG EXPOSURES IMAGES AND THEN PERFORMING INFINITE IMPULSE RESPONSE FILTERING ON SHORT EXPOSURE IMAGE

CROSS REFERENCE TO RELATED APPLICATIONS

This application claims priority from Japanese Patent Application No. 2012-0263136, filed on Nov. 30, 2012, in the Japanese Patent Office, and Korean Patent Application No. 10-2013-0098604, filed on Aug. 20, 2013, in the Korean Intellectual Property Office, the disclosures of which are incorporated herein in their entirety by reference.

BACKGROUND

1. Field

Apparatuses and methods consistent with exemplary embodiments relate to wide dynamic range (WDR) image processing.

2. Description of the Related Art

A wide dynamic range (WDR) is also referred to as a high dynamic range (HDR) but, hereinafter, is referred to as a WDR.

Recently, a WDR photographing function is increasingly used. The WDR photographing function is used to obtain an image in a dynamic range that exceeds a dynamic range within which an image sensor may capture an image, by sequentially photographing and synthesizing a short time-exposed image (hereinafter referred to as "a short-exposed image") and a long time-exposed image (hereinafter referred to as "a long-exposed image"). The WDR photographing function has a remarkable effect in an environment in which a contrast ratio is very high, such as an environment with backlight.

However, there are two problems that may be caused, with regard to a structure for synthesizing a short-exposed image with a long-exposed image. One problem is that, in synthesizing, an object in motion may cause deviation of contours of the object, and thus, an artifact in which a contour of the object may be doubled in an image. The other problem is that, if a flicker is photographed in a short-expose image and when the short-exposed image is used in synthesizing, a synthesized image that includes the flicker may be output. Thus, the image may not be clear. The inventive concept is provided mainly to address the other problem that relates to a flicker.

An example, in which a flicker is generated, may be a fluorescent lamp that does not include an inverter. Some light-emitting diode (LED) lighting, which has been supplied recently, has a low flickering frequency, and such low frequency flickering may still cause generation of a flicker. Additionally, a TV apparatus that includes a liquid-crystal display (LCD), or a display that is used for a personal computer (PC) increasingly employ flickering of backlight, so as to improve performance of a video display. The flickering of backlight may also cause generation of a flicker.

Hereinafter, methods of mitigating a flicker with regard to a WDR are described. One method is mainly to correct a difference between a white balance (WB) that is generated when images, which are photographed in an environment with a flashlight, are synthesized and a WB that is generated when images, which are photographed in an environment without a flashlight, are synthesized (refer to Japanese Patent Registration No. 2011-35894). In this case, a flicker may be reduced by weighted-averaging of several images. A WDR effect may also be obtained by weighted-averaging of several images. Additionally, a gain may be adjusted to correct a WB.

The other method is performed by comparing an image that is photographed with a shutter speed of $1/240$ second to an image that is photographed with a shutter speed of $1/60$ second, so as to detect a flicker (refer to Japanese Patent Registration No. 2012-119761). In this case, a priority is set respectively for several WDR synthesized images and a tone-compensated image that is obtained from a short-exposed image. Then, based on the corresponding priority, display or recording of the several WDR-synthesized images and the tone-compensated image that is obtained from the short-exposed image is controlled. If a flicker is detected, a combination ratio of the tone-compensated image, instead of the WDR synthesized images, may be raised.

However, the method, disclosed in Japanese Patent Registration No. 2011-35894, may have a less WDR effect, compared to a type of synthesizing a short-exposed image with a long-exposed image. Additionally, with regard to the method, disclosed in Japanese Patent Registration No. 2011-35894, since several images are weighted-averaged, frame memories, in correspondence with the number of frames, are needed, a memory size or a data transmission load may be increased. A motion detection result is employed for calculating a gain for adjusting the WB. However, a problem, in which a contour of an object in motion may be doubled due to weighted-averaging of several images, may not be solved.

With regard to the other method that is disclosed in Japanese Patent Registration No. 2012-119761, reference images for flicker determination need to be acquired before photographing. Additionally, while a moving image is photographed, if there is a change in whether a flicker is present or not, such a change may not be properly processed. If a flicker is detected by using the other method that is disclosed in Japanese Patent Registration No. 2012-119761, a combination ratio of a tone-compensated image, instead of the WDR synthesized images, may be raised. Thus, a WDR effect may remarkably deteriorate.

SUMMARY

One or more embodiments provide a technology for preventing an increase in a memory capacity and a data transmission load, preventing doubling of an image of an object in motion, and obtaining a great WDR effect with regard to a moving image with a flicker, by performing WDR processing for synthesizing a short-exposed image with a long-exposed image.

Various aspects will be set forth in part in the description which follows and, in part, will be apparent from the description, or may be learned by practice of the presented exemplary embodiments.

According to an aspect of an exemplary embodiment, there is provided an image processing apparatus which includes a detection unit and a processing unit.

The detection unit may detect a motion by using a long-exposed image in a current frame and a long-exposed image in a previous frame The processing unit may perform infinite impulse response (IIR) filtering on a short-exposed image in the current frame by setting a cyclic coefficient of the IIR filtering according to a result of the detecting of the motion, which is obtained from the detection unit.

The processing unit may combine a result of the IIR filtering that is performed on the short-exposed image in the current frame and a result of the IIR filtering that is performed on the short-exposed image in the previous frame, and output a result of the combining of the results.

The processing unit may perform the IIR filtering on the short-exposed image in the current frame by, if a value of the motion is high, setting a cyclic coefficient of the IIR filtering on the short-exposed image in the current frame to be high.

According to an aspect of another exemplary embodiment, there is provided an image processing method which includes detecting of a motion and performing of IIR filtering.

The detecting of the motion may be performed by detecting the motion by using a long-exposed image in a current frame and a long-exposed image in a previous frame.

The IIR filtering may be performed by setting a cyclic coefficient of the IIR filtering according to a result of the detecting of the motion.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
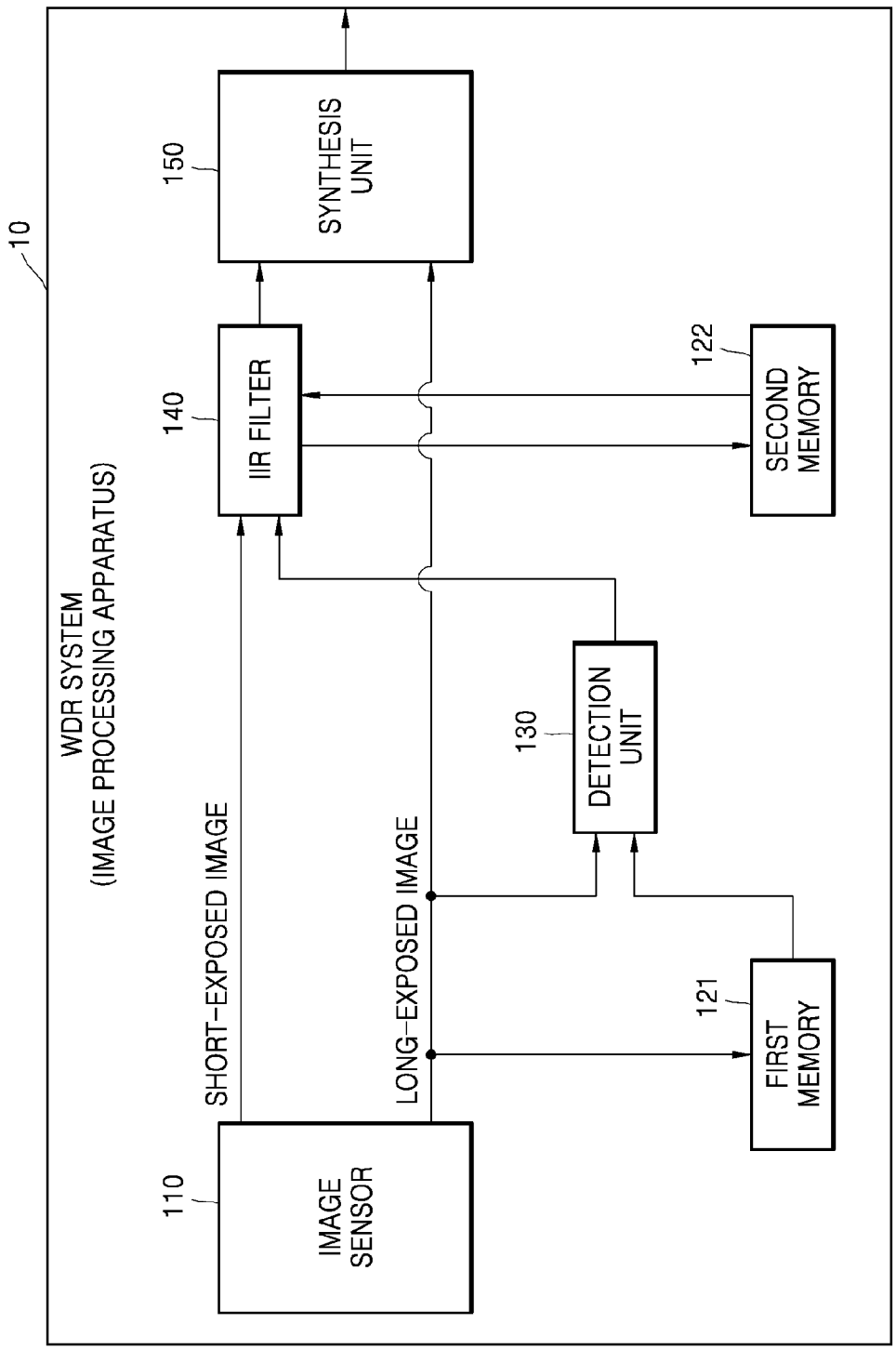
FIG. 1 is a block diagram of a wide dynamic range (WDR) system that is used as an image processing apparatus according to an exemplary embodiment.

The following description and accompanying drawings are provided for better understanding of the inventive concept. In the following description, well-known functions or constructions are not described in detail if it is determined that they would obscure the inventive concept due to unnecessary detail.

The following description and drawings are not intended to restrict the scope of the inventive concept, and the scope of the inventive concept should be defined by the appended claims. The terms used in the following description are merely used to describe particular exemplary embodiments of the inventive concept and are not intended to limit the inventive concept.

Reference will now be made in detail to the exemplary embodiments illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the embodiments.

Several components, which have substantially the same function, may be differentiated with each other by putting another reference numeral after the same reference numeral. If it is not necessary to differentiate several components, which have substantially the same function, with each other, the same reference numerals are provided with the several components.

FIG. 1 is a block diagram of a wide dynamic range (WDR) system 10 that is used as an image processing apparatus according to an exemplary embodiment.

In the current embodiment, referring to FIG. 1, the WDR system 10 that is used as an image processing apparatus includes an image sensor 110, a first memory 121, a second memory 122, a detection unit 130, an infinite impulse response (IIR) filter 140 that is used as a processing unit, and a synthesis unit 150.

Hereinafter, a function of each of the foregoing components of the WDR system 10 is described sequentially in detail. According to an exemplary embodiment, the detection unit 130, the IIR filter 140 and the synthesis unit may be a software or hardware component, such as a Field Programmable Gate Array (FPGA) or Application Specific Integrated Circuit (ASIC), which performs certain tasks. These components may advantageously be configured to reside on one or more addressable storage media and configured to be executed on one or more processors. Thus, each of these components may include, by way of example, software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more computers in a communication system.

The image sensor 110 forms an image of light, which is emitted from the outside, on a light-receiving plane of an image device, photoelectrically converts the image-formed light into a quantity of electric charge, and thus converts the quantity of electric charge into an electrical signal. An example of the image sensor 110 may be a charge coupled device (CCD) image sensor or a complementary metal oxide semiconductor (CMOS) image sensor.

In the current embodiment, the image sensor 110 sequentially captures a long-exposed image and a short-exposed image. As shown in FIG. 1, if a long-exposed image and a short-exposed image are sequentially photographed, the WDR system 10 includes at least two paths such as a path for outputting a long-exposed image from the image sensor 110 and another path for outputting a short-exposed image from the image sensor 110.

A long-exposed image in a previous frame, which is photographed for a relatively long exposure time, is stored in the first memory 121.

A short-expose image in the previous frame, which is photographed for a relatively short exposure time, is output to the IIR filter 140. The IIR filter 140 performs IIR filtering on the short-exposed image in the previous frame, and then, stores a result of the IIR filtering in the second memory 122.

In a next frame cycle, the image sensor 110 obtains a long-exposed image and a short-exposed image in a current frame. In the current embodiment, the previous frame refers to a frame which is one frame before the current frame.

In the present exemplary embodiments, terms such as a short-exposed image and a long-exposed image do not limit absolute exposure times respectively for two photographed images. In other words, if two images that have different exposure times are photographed, an image that has a relatively short-exposure time, from among the corresponding two images, corresponds to a short-exposure time, and an image that has a relatively long-exposure time corresponds to a long-exposure time.

The IIR filter 140 that is used as a processing unit which sets a cyclic coefficient of IIR filtering according to a result of motion detection obtained from the detection unit 130 to perform IIR filtering on the short-exposed image in the current frame, which is output from the image sensor 110.

The IIR filter 140 combines a result of the IIR filtering that is performed on the short-exposed image in the current frame, with a result of the filtering that is performed on the short-exposed image in the previous frame, and outputs a result of the combining of the results.

In the current embodiment, Y, which is an output pixel value that is obtained from the IIR filter, may be expressed as Equation 1 below.

$$Y = K \times X_t + (1-K) \times X_{t-1} \quad (1)$$

In Equation 1, K is a cyclic coefficient of IIR filtering, which has a value of 0 to 1, $X_t$ is a pixel value of the short-exposed image in the current frame, and $X_{t-1}$ is a result of processing that is performed on a pixel value in the short-exposed image in the previous frame by using the IIR filter 140.

Accordingly, Y, which is an output pixel value, is a result of IIR filtering that is performed on a pixel value in the short-exposed image in the current frame. The output pixel value Y is output to the synthesis unit 150 and, at the same time, stored in the second memory 122, and thus used as $X_{t-1}$ in a next frame.

If a cyclic coefficient K of IIR filtering is decreased, an effect of weighted-averaging of a plurality of frames is increased. Thus, a degree in which a flicker is mitigated is increased. However, if a cyclic coefficient K of IIR filtering is decreased, contours of an object, which is located in a place where a motion is present, may overlap with each other.

On the contrary, if a cyclic coefficient K of IIR filtering is increased, the output pixel value Y approximates pixel values in the current frame. Accordingly, if the cyclic coefficient K of IIR filtering is increased, contours of an object, which is located in a place where a motion is present, may not overlap with each other. However, as the cyclic coefficient K of IIR filtering is increased, a filtering effect in a time direction is decreased and a flicker mitigation effect is also decreased.

As a reference, if the exemplary embodiments of the inventive concept are not limited to the IIR filtering and several frames are weighted-averaged for dynamic range expansion or noise reduction, contours of an object, which is located in an area where a motion is present, may overlap with each other, thereby causing an unnatural image. As an example to address such a problem, a motion may be detected, and pixels of frames may not be weighted-averaged for an area in which a motion is present.

However, this may be executed only when a lighting environment is not changed. If an image that includes a flicker is input, since the flicker is not distinguished from a motion, a malfunction may be generated, and thus, a desired effect may not be obtained.

According to an exemplary embodiment, such problem may be addressed by using a motion detection method, which is described below hereinafter, based on characteristics of a photographing method using the WDR system.

Generally, a shutter speed for a long-exposed image is equal to or longer than a flicker frequency. Thus, a flicker may not be included in the long-exposed image. Accordingly, a motion value may be obtained simply by a difference between the frames of the long-exposed images.

Based on this, the detection unit 130 detects a motion by using the long-exposed image in the current frame, which is output from the image sensor 110, and the long-exposed image in the previous frame, which is output from the first memory 121.

When the detection unit 130 detects a motion by obtaining a difference of the frames of the long-exposed image, if a value of a frame difference is less than a first threshold value, it is determined that a motion is not present, and thus a value of the motion is set as a minimum value.

Additionally, if a value of the frame difference is greater than a second threshold value, it is determined that a motion is present, and thus a value of the motion is set as a maximum value.

Additionally, if a value of a frame difference is a value within a range between the first threshold value and the second threshold value, a value of a result of detecting a motion, that is, a value of a motion is set in proportion to a difference of the frames of the long-exposed image.

A value of a result of the motion detection in the long-exposed image, that is, the motion value, which is obtained from the detection unit 130, is input to the IIR filter 140. In correspondence with this, a cyclic coefficient of IIR filtering is adaptively set.

Then, an example in which a cyclic coefficient of IIR filtering is controlled according to a result of motion detection, that is, a motion value, is described.

Figure 2:
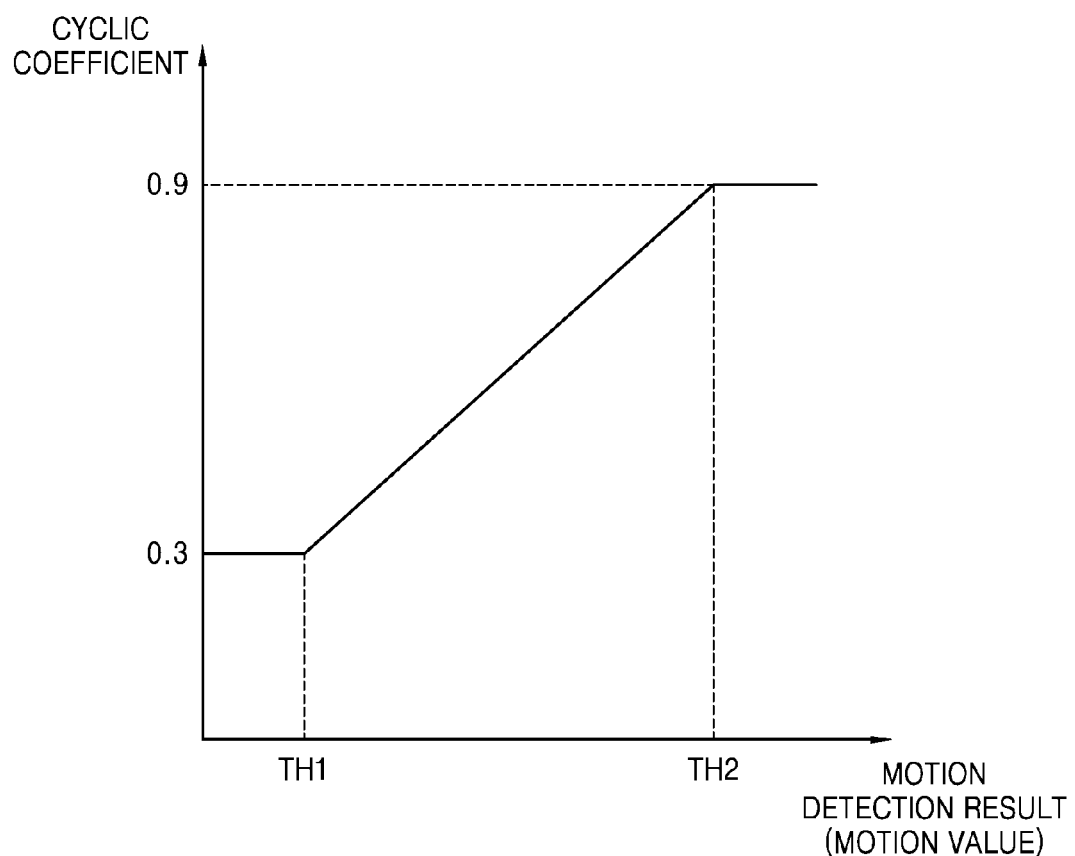
FIG. 2 is a graph showing an example of a relation between a motion detection result and a cyclic coefficient of infinite impulse response (IIR) filtering, according to an exemplary embodiment.

FIG. 2 is a graph showing an example of a relation between a motion detection result and a cyclic coefficient of IIR filtering, according to an exemplary embodiment.

Referring to FIGS. 1 and 2, when a motion detection result, that is, a motion value is high, the IIR filter 140 sets a cyclic coefficient of IIR filtering to be high to perform IIR filtering. TH1 and TH2, shown in FIG. 2, represent threshold values that are used to determine whether a motion is present or not.

If a motion detection result, that is, a motion value is less than the first threshold TH1, the IIR filter 140 sets a cyclic coefficient of IIR filtering to "0.3" which is a minimum value. Accordingly, an effect of weighted-averaging of several frames is improved, thereby improving an effect of flicker mitigation.

If a motion detection result, that is, a motion value is greater than the second threshold TH1, the IIR filter 140 sets a cyclic coefficient of IIR filtering to "0.9" which is a maximum value. Accordingly, an effect of weighted-averaging of several frames is reduced, thereby preventing an unnatural image that may be caused by overlapping of contours of an object in motion.

If a motion detection result, that is, a motion value is a value within a range between the first threshold value TH1 and the second threshold value TH2, the IIR filter 140 sets a cyclic coefficient of IIR filtering in proportion to the motion detection result, that is, a motion value.

The synthesis unit 150 synthesizes the long-exposed image in the current frame with a result of the IIR filtering that is performed on the short-exposed image in the current frame. For example, the synthesis unit 150 synthesizes the long-exposed image in the current frame with a result of the IIR filtering that is performed on the short-exposed image in the current frame according to information about selection, thereby generating a WDR image.

Algorithms for selecting one of the long-exposed image in the current frame and the result of the IIR filtering that is performed on the short-exposed image in the current frame are various.

For example, since it may be highly possible that an area, saturated in the long-exposed image, is not saturated in the short-exposed image, the short-exposed image may be selected as an image that is used in the corresponding area. However, the selecting of the short-exposed image in this manner may cause an artifact in which a contour of an object is doubled in an area where a large motion is present. In this case, a processing for detecting a motion and reducing the doubling of the contour may be executed. An algorithm for selecting one of the short-exposed image, on which the IIR filtering is performed, and the long-exposed image is not particularly limited.

Additionally, the synthetic unit 150 may generate a WDR image by synthesizing the long-exposed image in the current frame with a result of IIR filtering that is performed on the short-exposed image in the current frame, according to a combination ratio between the short-exposed image and the long-exposed image. For example, if a degree of saturation of the long-exposed image is high, a combination ratio of the short-expose image is set high. Additionally, if a motion in the short-exposed image or the long-exposed image is large, a combination ratio of the short-expose image is set high. An algorithm for calculating a mixing ratio between the short-exposed image and the long-exposed image is not particularly limited.

For example, if a combination ratio of the long-exposed image is set as α, the synthesis unit 150 may employ Equation 2, shown below, for each pixel that respectively corresponds to the long-exposed image in the current frame and a result of IIR filtering that is performed on the short-exposed image in the current frame.

$$Y_F = \alpha \times X_{Lt} + (1-\alpha) \times X_{St} \qquad (2)$$

In Equation 2, $Y_F$ is a pixel value that is output from the synthesis unit 150, $X_{Lt}$ is a pixel value of the long-exposed image in the current frame, and $X_{St}$ is a pixel value of a result of IIR filtering that is performed on a short-exposed image in the current frame.

Accordingly, a frame image that is obtained by applying Equation 2 to each pixel is a WDR image. Additionally, selection information or a combination ratio may be generated from an inside or outside of the WDR system 10. A synthesizing method performed by using the synthesis unit 150 is not particularly limited.

Figure 3:
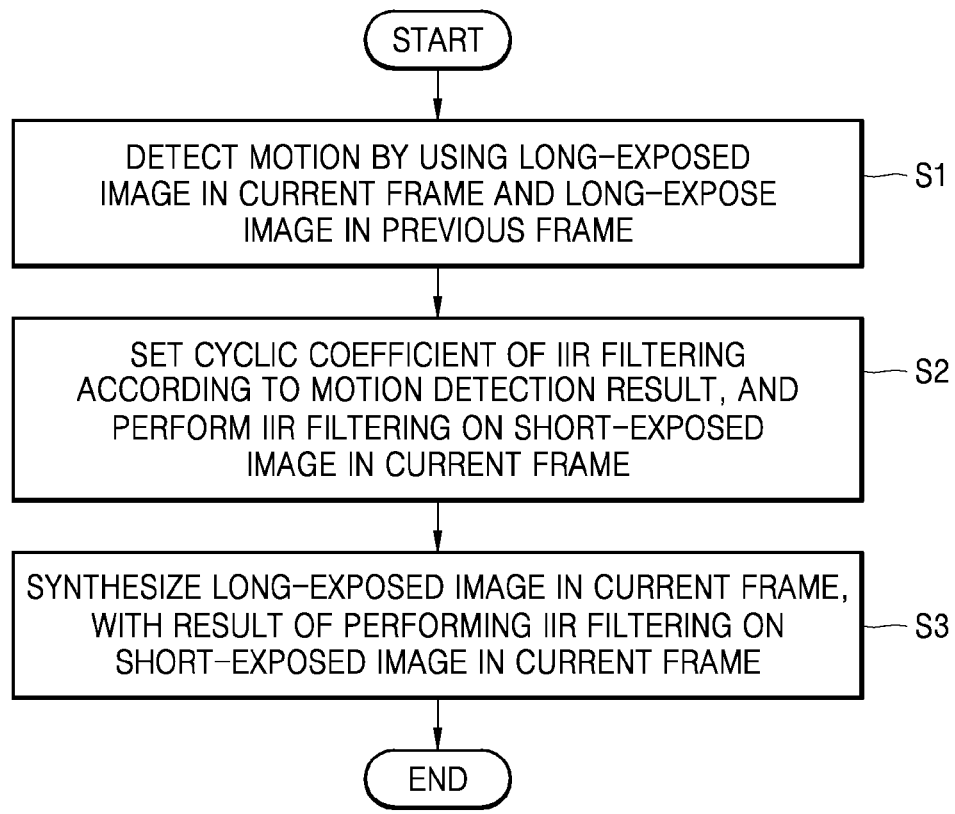
FIG. 3 is a flowchart illustrating an example of an image processing method that is applied to the WDR system of FIG. 1, according to an exemplary embodiment.

FIG. 3 is a flowchart illustrating an example of an image processing method that is applied to the WDR system of FIG. 1, according to an exemplary embodiment.

As shown in FIG. 3, in operation S1, the detection unit 130 detects a motion by using a long-exposed image in a current frame, which is output from the image sensor 110, and a long-exposed image in a previous frame, which is output from the first memory 121.

In operation S2, the IIR filter 140 sets a cyclic coefficient of IIR filtering according to a motion detection result, that is, a value of a motion that is detected by the detection unit 130, and performs IIR filtering on a short-exposed image in the current frame, which is output from the image sensor 110, by using the set cyclic coefficient.

In operation S3, the synthesis unit 150 synthesizes the long-exposed image in the current frame, which is output from the image sensor 110, and a result of IIR filtering that is performed on the short-exposed image in the current frame, which is output from the IIR filter 140.

A result of the IIR filtering that is performed on the short-exposed image in the current frame is stored in the second memory 122 to be used as a result of IIR filtering that is performed on a short-exposed image in a previous frame when IIR filtering is performed on a next frame.

Operations S1 through S3 are performed respectively for each frame.

According to the exemplary embodiments of the inventive concept, an image processing apparatus and method may prevent an increase in a memory capacity and a data transmission load, prevent doubling of an image of an object in motion, and obtain a great WDR effect with regard to a moving image that includes a flicker, by performing WDR processing for synthesizing a short-exposed image and a long-exposed image.

The above embodiments can also be embodied as computer readable codes on a computer readable recording medium, or to be transmitted through a transmission medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Hereinafter, according to an exemplary embodiment, an effect that may be obtained by using the method is described in detail.

According to an exemplary embodiment, a method of, before WDR synthesis, mitigating a flicker that is included in a short-exposed image is employed. A flicker may be mitigated by performing IIR filtering. If a method of weighted-averaging of images in several frames, contours of an object in motion may overlap with each other, and an image may become unnatural.

According to an exemplary embodiment, in order to address such a problem, a motion value may be acquired with high precision by detecting a motion using a long-exposed image that does not include a flicker. Then, the motion value may be adopted to set a cyclic coefficient of IIR filtering.

Additionally, if a method of mitigating a flicker for WDR synthesis, it may be difficult to distinguish a flicker from a motion, and thus, a flicker may not be mitigated. According to an exemplary embodiment, a flicker that is included in a short-exposed image may be mitigated before WDR synthesis. Thus, a stable WDR synthesis may be executed, without having to consider a flicker for WDR synthesis.

As described above, according to the one or more of the above embodiments, an image processing apparatus and method may prevent an increase in a memory capacity and a data transmission load, prevent doubling of an image of an object in motion, and obtain a great WDR effect with regard to a moving image with a flicker, by performing a WDR processing for synthesizing a short-exposed image and a long-exposed image.

It should be understood that the exemplary embodiments described therein should be considered in a descriptive sense only and not for purposes of limitation. Descriptions of features or aspects within each embodiment should typically be considered as available for other similar features or aspects in other embodiments.

For example, according to an exemplary embodiment, bayer data is employed as a signal to be processed. However, red-green-blue (RGB) data or Y-signal U-signal V-signal (YUV) data may be employed instead of the bayer data.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image processing apparatus comprising:
a detection unit configured to detect a motion by using a long-exposed image in a current frame and a long-exposed image in a previous frame; and a processing unit configured to perform infinite impulse response (IIR) filtering on a short-exposed image in the current frame according to a result of the detecting of the motion which is obtained from the detection unit.

2. The image processing apparatus of claim 1, wherein the long-exposed image and the short-exposed image are sequentially captured by an image sensor.

3. The image processing apparatus of claim 2, wherein the processing unit is configured to combine a result of the IIR filtering that is performed on the short-exposed image in the current frame and a result of the IIR filtering that is performed on the short-exposed image in the previous frame, and output a result of the combining of the results.

4. The image processing apparatus of claim 3, wherein the processing unit is configured to perform the IIR filtering on the short-exposed image in the current frame by using a cyclic coefficient which varies according to the result of the detecting of the motion.

5. The image processing apparatus of claim 4, wherein the cyclic coefficient is set to be proportional to a motion value corresponding to the result of the detection of the motion at least within a predetermined range.

6. The image processing apparatus of claim 5, wherein the predetermined range is between a first threshold and a second threshold, and
wherein, if the motion value is lower than the first threshold, the cyclic coefficient is set to a minimum value, and if the motion value is higher than the second threshold, the cyclic coefficient is set to a maximum value.

7. The image processing apparatus of claim 6, further comprising a synthesis unit configured to synthesize the long-exposed image in the current frame and the result of the IIR filtering that is performed on the short-exposed image in the current frame obtained from the processing unit.

8. The image processing apparatus of claim 1, wherein the processing unit is configured to combine a result of the IIR filtering that is performed on the short-exposed image in the current frame and a result of the IIR filtering that is performed on the short-exposed image in the previous frame, and output a result of the combining of the results.

9. The image processing apparatus of claim 1, wherein the processing unit is configured to perform the IIR filtering on the short-exposed image in the current frame by using a cyclic coefficient which varies according to the result of the detecting of the motion.

10. The image processing apparatus of claim 1, further comprising a synthesis unit configured to synthesize the long-exposed image in the current frame and the result of the IIR filtering that is performed on the short-exposed image in the current frame obtained from the processing unit.

11. An image processing method comprising:
detecting a motion by using a long-exposed image in a current frame and a long-exposed image in a previous frame; and
performing infinite impulse response (IIR) filtering on the short-exposed image in the current frame according to a result of the detecting of the motion.

12. The image processing method of claim 11, wherein the long-exposed image and the short-exposed image are sequentially captured by an image sensor.

13. The image processing method of claim 12, wherein the IIR filtering is performed by combining the result of the IIR filtering that is performed on the short-exposed image in the current frame and a result of the IIR filtering that is performed on a short-exposed image in the previous frame, and outputting a result of the combining of the results.

14. The image processing method of claim 13, wherein the IIR filtering on the short-exposed image in the current frame is performed by using a cyclic coefficient which varies according to the result of the detecting of the motion.

15. The image processing method of claim 14, wherein the cyclic coefficient is set to be proportional to a motion value corresponding to the result of the detection of the motion at least within a predetermined range.

16. The image processing method of claim 15, wherein the predetermined range is between a first threshold and a second threshold, and
wherein, if the motion value is lower than the first threshold, the cyclic coefficient is set to a minimum value, and if the motion value is higher than the second threshold, the cyclic coefficient is set to a maximum value.

17. The image processing method of claim 16, further comprising synthesizing the long-exposed image in the current frame and a result of the IIR filtering that is performed on the short-exposed image in the current frame.

18. The image processing method of claim 11, wherein the IIR filtering is performed by combining the result of the IIR filtering that is performed on the short-exposed image in the current frame and a result of the IIR filtering that is performed on a short-exposed image in the previous frame, and outputting a result of the combining of the results.

19. The image processing method of claim 11, wherein the IIR filtering on the short-exposed image in the current frame is performed by using a cyclic coefficient which varies according to the result of the detecting of the motion.

20. The image processing method of claim 11, further comprising synthesizing the long-exposed image in the current frame and a result of the IIR filtering that is performed on the short-exposed image in the current frame.

* * * * *